United States Patent [19]
Offner

[11] 3,743,965
[45] July 3, 1973

[54] TUNABLE LASERS

[75] Inventor: Franklin F. Offner, Deerfield, Ill.

[73] Assignee: Spectro-Physics Inc., Mountain View, Calif.

[22] Filed: July 12, 1971

[21] Appl. No.: 161,866

Related U.S. Application Data

[63] Continuation of Ser. No. 564,428, July 11, 1966, abandoned, which is a continuation of Ser. No. 247,045, Dec. 26, 1962.

[52] U.S. Cl. .............................................. 331/94.5
[51] Int. Cl. ............................................. H01s 3/00
[58] Field of Search ...................... 331/94.5; 356/99, 356/100

[56] References Cited
UNITED STATES PATENTS

| | | | |
|---|---|---|---|
| 3,179,899 | 4/1965 | Fox | 331/94.5 C |
| 3,388,314 | 6/1968 | Gould | 331/94.5 G |
| 2,874,608 | 2/1959 | Beloian | 356/100 |
| 3,248,660 | 4/1966 | Fajans | 331/94.5 C |
| 3,230,475 | 1/1966 | Koester et al. | 331/94.5 C |
| 3,048,080 | 8/1962 | White | 356/99 |

*Primary Examiner*—Ronald L. Wibert
*Attorney*—Jerald E. Rosenbaum et al.

[57] ABSTRACT

Apparatus for obtaining laser action at a selected wavelength comprises a body such as a crystal composed of a substance that may be optically pumped in accordance with known laser principles. A glow discharge tube serves as a source of input radiation energy for the optical pumping and excites energy levels from which radiation is emitted at a plurality of wavelengths. An optical path for the crystal is provided and includes a pair of reflective surfaces between which the crystal and a prism are located, one of the reflective surfaces being constituted by a reflective coating on a face thereof at the side of the prism remote from the crystal. The prism is made from a material whose index of refraction varies with a variation in the wavelength of the radiation produced by the crystal and is mounted for adjusting its orientation such that only the radiation at the selected wavelength is repetitively reflected back and forth between the reflective surfaces, and radiations at all other wavelengths are lost from the path by dispersion in the prism.

22 Claims, 2 Drawing Figures

TUNABLE LASERS

This application is a continuation of application Ser. No. 564,428, filed July 11, 1966, now abandoned which is, in turn, a continuation of application Ser. No. 247,045, filed Dec. 26, 1962.

This invention relates to devices which exhibit light amplification by stimulated emission of radiation, commonly called lasers, and more particularly to a method and arrangement for controlling the wave length and intensity of radiation emitted by such devices.

The laser, sometimes termed an optical maser, belongs to the maser family of amplifying devices. A maser provides microwave amplification by stimulated emission of radiation. Thus, masers operate in the microwave radio frequencies and lasers operate in the infrared and visible light frequencies.

The primary concepts on which the maser and laser are based were revealed by Albert Einstein in his discussion of the acute problems that arose in the early days of the quantum theory of radiation. When an atom is in an excited state, i.e., a state of higher than normal energy, the normal state being the ground state, it emits radiation by dropping to a state of lower energy. This action was considered to be a random process in which each type of atom has an average lifetime in the excited state. Einstein proposed that, in addition to the random process, the descent from an excited state could be initiated by radiation of appropriate frequency. This type of emission is known as stimulated emission. Additionally, Einstein showed that the probability of this process taking place is proportional to the intensity of the radiation field in which the atom is situated, and is exactly equal to the probability of excitation of an atom from the lower state to the higher state by the radiation.

There is one process for excitation by radiation which is the absorption of a quantum of radiation. For de-excitation there are two processes — stimulated emission of a quantum and spontaneous emission of a quantum. The former has frequently been forgotten and the latter has been generally considered the more important. In lasers, however, the stimulated emission predominates.

The prime requisite of the laser material is its ability to undergo stimulated emission. A number of solids and gases meet this requirement. Among solids, chromium, uranium, and several rare earths appear to be the best suited for stimulated emission. These materials are used in the form of dopants, which are minute quantities dispersed in a variety of host materials. The active substance generally accounts for less than a very small percentage of the total doped material. The host materials, including crystals, glasses, gases and liquids, function primarily to maintain the active atoms apart from one another and to remove unwanted heat. To date, the single crystal ruby which is composed of aluminum oxide in which some aluminum atoms are replaced by chromium atoms is the most widely used solidstate laser material. Glass is also used as a host for active rare-earth elements. It has been discovered that a specially prepared gallium arsenide diode will lase. Liquids are used as a host for solid laser substances. Laser action has been reported in a liquid doped with terbium. Argon, helium, krypton, neon, oxygen, and xenon have turned out to be active laser substances. Oxygen is used in mixtures of argon-oxygen or neon-oxygen. Neon produces laser action either as a single gas or as a constituent of a helium-neon mixture. Argon, krypton, neon and xenon produce laser action when used in their pure form. The crystal lasers generally produce only a burst of radiation; whereas, gas lasers operate continuously and with a low energy input.

In the ruby laser for example, chromium atoms are "pumped" to higher energy levels and then stimulated to emit photons, producing a laser beam. Atoms in the ground state absorb photons which pump them to one or more of several energy bands. The atoms give up some of their energy to the crystal lattice and fall to a metastable energy level. When stimulated by photons from other chromium atoms, they emit photons (the output beam) of a characteristic wave length or wave lengths and fall to the ground state. Numerous articles have been published which detail the lasering action. Of particular interest is an article by Arthur L. Schawlow, entitled "Optical Masers" which appeared in *Scientific American* at pages 52 through 61 in June 1961, Vol. 204, No. 6.

Certain laser devices produce a single output line of a given frequency; whereas, others are capable of producing a plurality of output lines. For example, depending upon the pumping energy the ruby laser may lase at 7,009 Angstrom units, 6,934 and 7,009 Angstrom units, and 6,934, 7,009 and 7,041 Angstrom units. Thus, a single wave length, two simultaneous wave lengths or three simultaneous wave lengths may be produced. Gas lasers generate continuous waves and their collective outputs span a wide region of the spectrum. Krypton may produce a wave length of 21,890 Angstroms and a helium-neon combination may produce a wave length of 6,328 Angstroms. Several single gases yield more than one output frequency, for example, krypton produces seven.

Most of the solid-state lasers are "pumped" with light, i.e., light serves as the energy input. Xenon and mercury flash tubes are widely used for the light sources. Other means of pumping also are utilized. Gas lasers are pumped by employing electric energy. The electrons in the gas laser are continuously pumped to a state of excitement by high-voltage current or radio-frequency radiation. The gallium arsenide diode laser has been pumped directly by an electrical current rather than by an external light source.

The external source of energy, light or electricity, pumps the energy of the electrons in the laser material to a variety of higher levels. Spontaneously, the electrons drop to an intermediate, or metastable, energy level where they pause. A few electrons drop spontaneously from this intermediate level to a lower state, giving off photons of a certain wave length. If these light waves are reflected back and forth through the laser, they stimulate other electrons to emit light waves in the same direction and phase. A ruby laser may be operated, for example, whereby a chain reaction makes all the electrons at the excited level give up their energy in the form of a pulse of light at a single frequency, in a single direction, and with all the waves in phase.

As noted previously, certain lasers produce more than one line. Thus, when atoms in the laser are stimulated, all of them do not fall to the ground level. Additionally, the energy levels may be changed, at least slightly, by magnetic (Zeeman effect) or electrostatic fields. effect) FIELDS. However, according to the present state of the art, the output of the laser is not substantially selective or tunable and when plural lines are produced they are produced simultaneously.

According to a feature of the present invention, a material which lases at more than one wave length may be tuned to provide a selected wave length output.

According to a further feature of the present invention, a laser may be tuned by locating a dispersive or selectively absorptive element in the optical path thereof and selectively positioning a reflective device in a manner to allow the laser to produce a desired output wave length.

An additional feature of the present invention is the provision of a tunable laser in which dispersive or absorptive means is utilized to inhibit lasering action at selected frequencies.

According to a detailed embodiment of the present invention, an element having energy levels suitable for laser action at multiple wave lengths is employed in conjunction with a pumping energy source to excite the energy levels from which radiation can be emitted. A first reflecting surface is provided to reflect radiation emitted by the element back through the element and to a dispersive element. A second reflecting element is provided which reflects the radiant energy which has been dispersed by the dispersive element. At least the second reflecting element is oriented such that radiation of a desired wave length undergoes multiple reflection along a substantially repetitive path thereby giving rise to lasering action at a desired wave length. Alternatively, a selectively absorptive element may be employed in place of the dispersive element. In this case, the second reflecting element reflects only that radiation which is passed by the absorptive element to provide lasering action at the desired wave length.

Other features and objects of the invention will be better understood from a consideration of the following detailed description when read in conjunction with the attached figures.

DESCRIPTION OF THE PREFERRED EMBODIMENT

Figure 1:
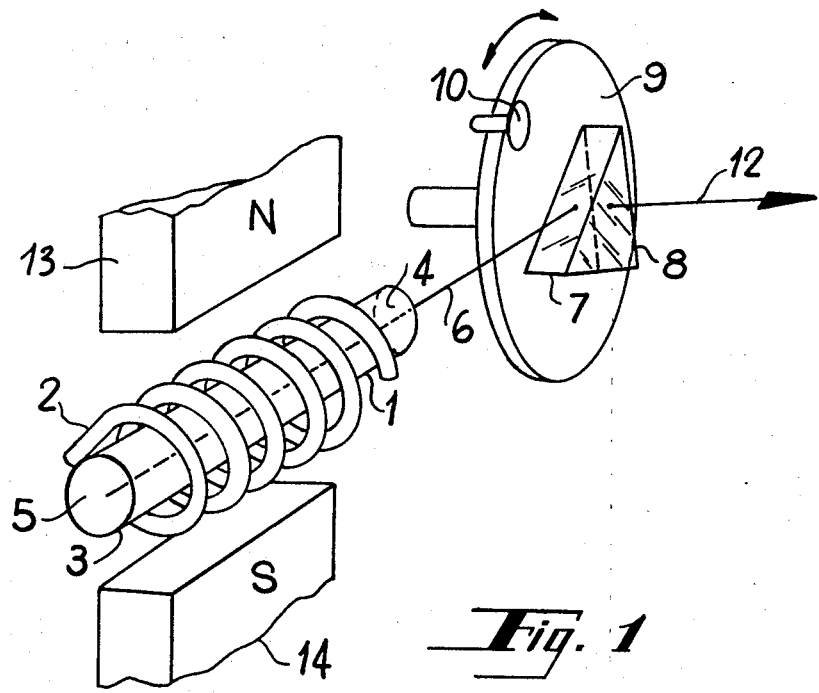
FIG. 1 illustrates a solid-state laser device employing the principles of the present invention and includes a magnetic field generating means for changing the laser frequency.

An exemplary embodiment of the invention is shown in the attached drawing in which the numeral 1 denotes a crystal or body of material which is composed of a substance that may be optically pumped in accordance with well-known principles of laser operation. A glow discharge tube 2 is provided to furnish the input radiation energy for the optical pumping of the crystal 1. The crystal 1 has its two faces 3 and 4 polished, and the face 3 is coated with a silver reflecting layer 5. The face 4 need not be silvered, or alternatively it may be slightly silvered but insufficiently to give high reflection for producing laser action.

A radiant energy beam 6 emerging from the face 4 of the crystal 1 is directed at a prism 7. A face 8 of the prism 7 is partially silvered to produce a partially reflecting surface. The prism 7 is mounted on a pedestal 9 which may be rotated by means of a knob 10.

In operation, the prism 7 is so oriented that light emerging from the crystal 1 in a direction perpendicular to the face 3 impinges upon the prism 7 and is refracted so that the light beam falls perpendicularly on the surface 8 of the prism 7. As a result, the beam 6 is reflected back along its original path, again falls on the crystal 1, and impinges perpendicularly on the face 3 of the crystal 1. The beam 6 is again reflected back on the prism surface 8 along the same path, and the process is repeated. It should be apparent that if the prism 7 is properly oriented as above described, the light beam 6 emerging from the crystal 1 along the stated path is multiply reflected back and forth through the crystal 1. If the light beam is of the wave length at which lasering action occurs, the conditions are thus suitable for laser action.

If the crystal 1 and prism 7 are slightly mis-oriented with respect to each other, the beam 6 no longer falls precisely perpendicular to the surface 8, and thus is not reflected back along its original path. If the mis-orientation is sufficient, the reflected ray may miss the crystal 1 entirely, or it may impinge on the crystal 1 for one or several reflections, but eventually no longer falls on the crystal and is lost. It is apparent that with sufficient mis-orientation of the prism 7 with respect to the crystal 1 laser action is inhibited.

The prism 7 is made of a material which shows dispersion in the wave length range at which the crystal 1 exhibits laser action. That is, the refraction of the beam 6 through the prism 7 is at varying angles, depending upon the wave length of the beam. Thus, if the prism 7 is properly oriented at one wave length, it is not properly oriented for lasering action at any other wave length. Actually lasing action may occur at wave lengths close to the precise theoretical wave length, since a certain number of re-reflections will be possible, but when the wave length departs too radically from the theoretical wave length, lasing action can no longer occur. The sensitivity of the action to prism orientation is directly proportional to the distance from the crystal at which the prism is mounted.

As noted previously, the surface 8 of the prism 7 is only partially silvered thereby allowing some fraction of the beam to emerge on each reflection. The usable light, denoted by a reference numeral 12, from the device may be obtained by transmission through the surface 8 of the prism 7. Radiation falling at an angle on the surface of the prism is partially reflected, and thereby lost. To reduce such reflections, as well as reflections from the surface of the crystal 1, the space between the prism 7 and the crystal 1 may be filled with a liquid having dispersive power different from, and preferably less than, the prism, and having an index of refraction nearly the same as the prism for several wave lengths in the region of the desired laser action.

As noted early in the specification, the crystal 1 may have several possible wave lengths at which laser action may occur and these wave lengths may occur simultaneously. By properly orienting the prism 7, the novel device herein described may be constrained to lase at only one wave length, the other wave lengths being thus suppressed from the output beam. The desired wave length beam reflected from the surface 8 must be maintained in phase with the desired wave length emitted by the crystal 1. Where a phase difference is encountered, the prism 7 may be moved toward or away from the crystal 1 to ensure the proper phase relationship.

In some crystals there are several possible transitions which may emit light at different wave lengths. In one transition, the transition probability is so much stronger than the others that in the normal laser configuration only the wave lengths of light corresponding to this transition can be generated. By orienting the prism so that the multiple reflections can occur at one of the other possible operating wave lengths, this selected wave length may be favored, so that lasering action will occur at this wave length while the transition having the higher transition probability is suppressed. In this way a laser element may be used for alternatively or successively obtaining several wave lengths of output light. The same discussion also applies to gas lasers.

It is well known that the precise wave lengths at which a crystal generates light by laser operation may be modified by placing it in a magnetic field, such as, between two poles 13 and 14 of an electromagnet. As the magnetic field between the poles of the magnet is changed, the wave length of the generated light beam is changed. At only one output wave length will the light beam fall at precisely the prescribed path for multiple reflections, and at this wave length lasering action will be the strongest, with the strongest emitted radiation. As the magnetic field departs from this optimum value, the intensity of the generated light beam is decreased. Thus, the intensity of the radiation emitted by the laser may be controlled by the strength of the magnetic field.

Figure 2:
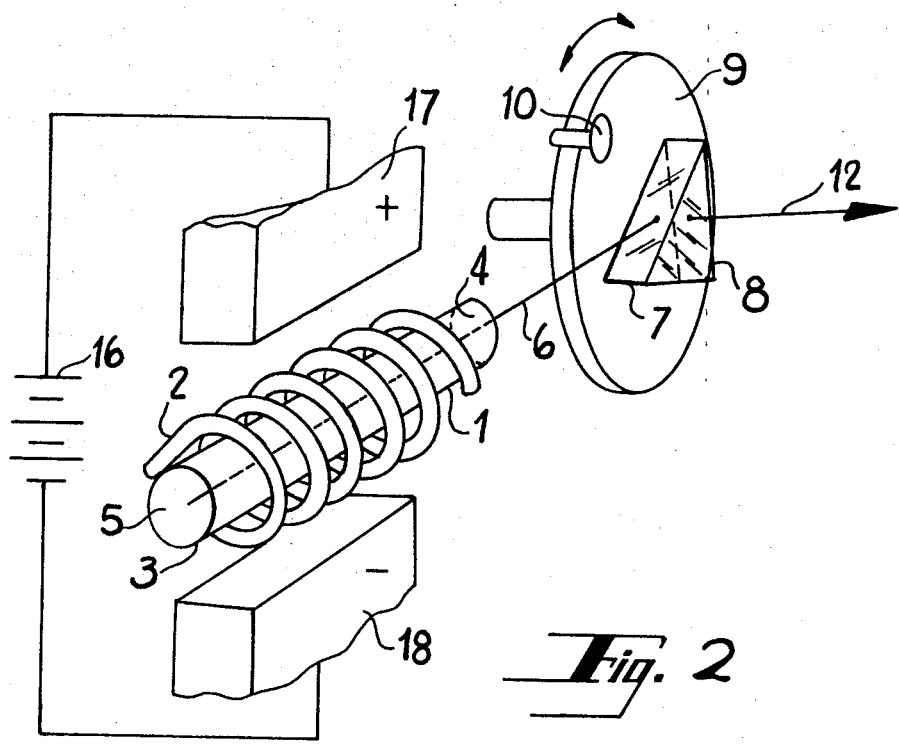
FIG. 2 illustrates a solid-state laser device employing the principles of the present invention and includes an electrostatic field generating means for changing the laser frequency.

Any other effect which may give a change in the wave length of the light generated by the crystal may similarly be used. For example, the crystal 1 may be placed in a strong electrostatic field, which also is well known, for example, by an electric field generating means 16, 17, 18 in FIG. 2 and this field will give a change in the wave length of the emitted light. By the configuration shown, this field may be employed to vary the intensity of the light.

It is apparent that other wave length selective elements may be employed to serve the function of the prism 7. For example, the prism may have no silvered surface and remain stationary. In this case a second mirror (corresponding to the surface 8 shown in the drawing) may be located behind the prism 7 whereby this second mirror is rotated instead of the prism. A succession of prisms may be employed with a separate mirror, or a diffraction grating may be employed as the dispersing element. As an alternative to the use of a prism or diffraction grating as a wave length selective element, one or more filters may be interposed between the crystal 1 and the second mirror to absorb radiation of the wave lengths to be suppressed, or the reflective mirrors may be inefficient at these wave lengths. More particularly, a graded interference filter may be used. This latter filter may be positioned to pass only a selected wave length. Additionally, as noted previously, the above principles in the arrangement shown in the attached drawing are equally applicable to other laser devices, such as, gas lasers.

It now should be apparent that the present invention provides a method and arrangement whereby a device which "lases" at more than one wave length may be tuned to provide a selected wave length output. Although a particular structural arrangement and particular type of laser have been discussed in connection with the specific embodiment of a tunable laser constructed in accordance with the teachings of the present invention, others may be utilized. Furthermore, it will be understood that although an exemplary embodiment of the present invention has been disclosed and discussed, other applications and arrangements are possible and that the embodiment disclosed may be subjected to various changes, modifications and substitutions without necessarily departing from the spirit of the invention.

I claim:

1. A tunable laser comprising in combination, a body of material having energy levels suitable for laser action, means for pumping energy into said material to excite energy levels from which radiation is emitted at a plurality of different wavelengths, means establishing an optical path repetitive for only a selected one of said wavelengths, said optical path extending through said body and through a prismatic dispersing element which produces an angular difference in the optical path of radiation traversing said element, said angular difference being dependent upon and variable with the wavelength of the radiation, and said optical path further including at least two reflective surfaces between which said body and prismatic dispersing element are located, said reflective surfaces being adjustable such that the radiation repetitively traverses said body and prismatic dispersive element at only the selected wavelength.

2. A tunable laser as defined in claim 1 and which further includes a controllable electrostatic field within the influence of which said body is placed for modifying the wavelength of the radiation emitted from said body.

3. A tunable laser as defined in claim 1 and which further includes a controllable magnetic field within the influence of which said body is placed for modifying the wavelength of the radiation emitted from said body.

4. A tunable laser comprising in combination a body of material having energy levels suitable for laser action, means establishing a reflecting surface normal to the optical path of said body and reflecting radiation emitted by said material back along said optical path, means for pumping energy into said material to excite energy levels from which radiation at a plurality of wavelengths is emitted, a prism having its frontal face positioned to receive radiation passing said optical path and having its rear face at least partially covered with a reflective coating, said prism being made of a material establishing therefor an index of refraction which varies as a function of the wavelength of said radiation and means for adjusting the orientation of said prism such that only one selected wavelength from said plurality of wavelengths impinges perpendicularly on said rear face and is thereby effective to produce multiple reflections of said selected wavelength along a substantially repetitive path between said reflective surface and reflective coating while all other wavelengths which impinge upon said rear face in a non-perpendicular direction are dispersed in said prism and removed from said path.

5. A tunable laser comprising in combination a body of material having energy levels suitable for laser action, means for pumping energy into said body to excite energy levels from which radiation is emitted at a plurality of wavelengths, means establishing an optical path through said body for repetitive passage of radiation therethrough at a selected wavelength, said optical path including a pair of reflective surfaces between which said body and a refractive dispersive element are located, said dispersive element being constituted by a prism having a reflecting coating on one of the faces thereof which constitutes one of said reflective surfaces and being made from a material whose refractive index varies with a variation in wavelength, and means for adjusting the orientation of said prism and hence the orientation of said reflective coating with respect to said optical path thereby to eliminate from said path by dispersion in said prism repetitive reflection of all radiation except that at said selected wavelength.

6. A tunable laser comprising in combination a body of material having energy levels suitable for laser action, means for pumping energy into said body to excite energy levels from which radiation is emitted at a plurality of wavelengths, means establishing an optical path through said body for repetitive passage of radiation therethrough at a selected wavelength, said optical path including a pair of reflective surfaces between which said body and a refractive dispersive element are located, said dispersive element being constituted by a prism and which is made from a material whose refractive index varies with a variation in wavelength, and means for adjusting the orientation of that reflective surface in said path which is located at the side of said prism away from said body thereby to eliminate from said path by dispersion in said prism repetitive reflection of all radiation except that at the selected wavelength.

7. A tunable laser comprising in combination a body of material having energy levels suitable for laser action, means for pumping energy into said body to excite energy levels from which radiation is emitted at a plurality of wavelengths, means establishing an optical path through said body for repetitive passage of radiation therethrough at a selected wavelength, said optical path including a pair of reflective surfaces between which said body and a refractive dispersive element are located, said dispersive element being constituted by a prism and which is made from a material whose refractive index varies with a variation in wavelength, and means for adjusting the relative orientation of said prism and reflective surfaces to eliminate from said path by dispersion in said prism repetitive reflection of all radiation except that at the selected wavelength.

8. An optical maser comprising an elongated negative temperature medium,
   means for applying excitation energy to said medium for establishing a population inversion therein,
   an elongated optical interferometer cavity comprising first and second external reflective end members,
   said negative temperature medium being disposed within said cavity in the path of light rays reflected between said end members,
   at least one of said members comprising a dielectric prism having a first surface at which said rays are refracted and a second surface at which said rays are reflected,
   said second surface being disposed orthogonally with respect to incident rays of the desired output frequency, and
   means for abstracting at least a portion of said rays at said desired frequency for utilization.

9. A method of selecting the operating frequency of an optical maser having an active medium which emits radiation at more than one wavelength capable of maser operation, which comprises the steps of: spatially dispersing said radiation by an amount which depends on the radiation wavelength; and selectively reflecting optical radiation at the desired wavelength through said active medium a sufficient number of times to sustain maser operation.

10. The method of claim 9 wherein said optical radiation is reflected between two reflecting surfaces, and including the step of adjusting the relative angular orientation of said surfaces to that position at which radiation of the selected wavelength undergoes multiple reflections between said surfaces.

11. An optical maser comprising: an active medium which emits radiation at more than one wavelength capable of maser operation; means for spatially dispersing said radiation by an amount which depends on the radiation wavelength; and means for selectively reflecting optical radiation at the desired operating wavelength through said active medium a sufficient number of times to sustain maser operation.

12. An optical maser according to claim 11 wherein said dispersing means is a diffraction grating.

13. An optical maser according to claim 11 wherein said dispersing means is a prism.

14. An optical maser according to claim 13 wherein said reflecting means includes two mirrors and said prism is interposed between said mirrors so that said mirrors are selectively optically aligned at said desired wavelength.

15. An optical maser according to claim 11 wherein said reflecting means includes two reflecting surfaces optically communicating through said active medium, and further including means varying the relative angular orientation of said surfaces for changing the operating frequency from one wavelength to at least one other near-by wavelength.

16. An optical maser according to claim 14 wherein said active medium is in a gaseous state and contained within a tubular container, said mirrors are positioned external of said medium and adjacent each end of said container, and said prism is interposed between said container and one of said mirrors.

17. A visible output optical maser, comprising: an active medium which emits radiation at more than one wavelength capable of maser operation, at least one of said wavelengths being a desired visible wavelength; means for spatially dispersing said radiation by an amount which depends on the radiation wavelength; and means for selectively reflecting radiation at said desired visible wavelength through said medium a sufficient number of times to sustain maser operation at said desired wavelength.

18. An optical maser, comprising: an active medium which emits optical radiation at at least two wavelengths with stimulated emission gain, each of said wavelengths resulting from a different energy level transition of said active medium; means for reflecting optical radiation emitted by said active medium back through said active medium; and means for spatially separating the optical radiation at each of said wavelengths by a sufficient amount that said reflecting means reflects only the radiation at one of said two wavelengths in the proper direction for sustaining maser operation.

19. An optical maser, comprising: an active medium which emits optical radiation at at least two wavelengths with stimulated emission gain; means for reflecting optical radiation emitted by said active medium back through said active medium; and dispersive means which angularly deflects optical radiation through an angle which varies continuously as a function of wavelength in the wavelength range between each of said two wavelengths with the difference in angle between the radiation at each of said wavelengths being sufficiently large that said reflecting means reflects only the radiation at one of said two wavelengths in the proper direction for sustaining maser action.

20. An optical maser according to claim 19 wherein said active medium is a gaseous active medium.

21. An optical maser according to claim 19 wherein said dispersive means is a diffraction grating.

22. An optical maser according to claim 19 wherein said dispersive means is a prism.

* * * * *

UNITED STATES PATENT OFFICE
CERTIFICATE OF CORRECTION

Patent No. 3,743,965     Dated  July 3, 1973

Inventor(s) Franklin F. Offner

It is certified that error appears in the above-identified patent and that said Letters Patent are hereby corrected as shown below:

| | |
|---|---|
| Cover Page re Assignee | "Spectro-Physics, Inc." should read --Spectra-Physics, Inc.-- |
| Cover Page re Attorney | "Rosenbaum" should read --Rosenblum--. |
| Col. 2 Line 64 | Before "fields", insert --(Stark effect)--; |
| | After "fields", delete ",effect) FIELDS". |

Signed and sealed this 20th day of November 1973.

(SEAL)
Attest:

EDWARD M. FLETCHER, JR.
Attesting Officer

RENE D. TEGTMEYER
Acting Commissioner of Patents